(12) United States Patent
Sriram et al.

(10) Patent No.: US 10,971,142 B2
(45) Date of Patent: Apr. 6, 2021

(54) SYSTEMS AND METHODS FOR ROBUST SPEECH RECOGNITION USING GENERATIVE ADVERSARIAL NETWORKS

(71) Applicant: Baidu USA, LLC, Sunnyvale, CA (US)

(72) Inventors: Anuroop Sriram, Sunnyvale, CA (US); Hee Woo Jun, Sunnyvale, CA (US); Yashesh Gaur, Santa Clara, CA (US); Sanjeev Satheesh, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 172 days.

(21) Appl. No.: 16/154,648

(22) Filed: Oct. 8, 2018

(65) Prior Publication Data

US 2019/0130903 A1 May 2, 2019

Related U.S. Application Data

(60) Provisional application No. 62/578,102, filed on Oct. 27, 2017.

(51) Int. Cl.
  *G10L 15/20* (2006.01)
  *G10L 15/06* (2013.01)
  *G10L 15/16* (2006.01)

(52) U.S. Cl.
  CPC ............ *G10L 15/20* (2013.01); *G10L 15/063* (2013.01); *G10L 15/16* (2013.01); *G10L 2015/0631* (2013.01)

(58) Field of Classification Search
  CPC ............. G06N 3/08; G06N 5/04; G06F 40/30
  See application file for complete search history.

(56) References Cited

U.S. PATENT DOCUMENTS

| | | | |
|---|---|---|---|
| 10,510,358 B1* | 12/2019 | Barra-Chicote | G10L 25/30 |
| 2018/0165554 A1* | 6/2018 | Zhang | G06K 9/6256 |
| 2018/0329884 A1* | 11/2018 | Xiong | G06N 3/0445 |

(Continued)

FOREIGN PATENT DOCUMENTS

WO  2019022840 A1  1/2019

OTHER PUBLICATIONS

Kaneko et al., "Sequence-to-sequence voice conversion with similarity metric learned using generative adversarial networks", Interspeech, Aug. 2017. (Year: 2017).*

(Continued)

*Primary Examiner* — Anne L Thomas-Homescu
(74) *Attorney, Agent, or Firm* — North Weber & Baugh LLP

(57) ABSTRACT

Described herein are systems and methods for a general, scalable, end-to-end framework that uses a generative adversarial network (GAN) objective to enable robust speech recognition. Encoders trained with the proposed approach enjoy improved invariance by learning to map noisy audio to the same embedding space as that of clean audio. Embodiments of a Wasserstein GAN framework increase the robustness of seq-to-seq models in a scalable, end-to-end fashion. In one or more embodiments, an encoder component is treated as the generator of GAN and is trained to produce indistinguishable embeddings between labeled and unlabeled audio samples. This new robust training approach can learn to induce robustness without alignment or complicated inference pipeline and even where augmentation of audio data is not possible.

20 Claims, 6 Drawing Sheets

(56) References Cited

U.S. PATENT DOCUMENTS

| | | | | |
|---|---|---|---|---|
| 2018/0336884 | A1* | 11/2018 | Sriram | G06N 3/08 |
| 2018/0341630 | A1* | 11/2018 | DeVries | G06F 40/284 |
| 2019/0013012 | A1* | 1/2019 | Hwang | G06F 40/56 |
| 2019/0026274 | A1* | 1/2019 | Deng | G06N 3/0454 |
| 2019/0043506 | A1* | 2/2019 | Rivkin | G10L 15/32 |
| 2019/0051310 | A1* | 2/2019 | Chang | G10L 19/005 |
| 2019/0066660 | A1* | 2/2019 | Liang | G06F 40/169 |
| 2019/0080205 | A1* | 3/2019 | Kaufhold | G06K 9/6257 |
| 2019/0087734 | A1* | 3/2019 | Ide | G10L 15/183 |
| 2019/0103092 | A1* | 4/2019 | Rusak | G06N 20/00 |
| 2019/0122101 | A1* | 4/2019 | Lei | G06F 17/16 |
| 2019/0341021 | A1* | 11/2019 | Shang | G06F 16/3329 |
| 2020/0110916 | A1* | 4/2020 | Chang | G06N 3/08 |

OTHER PUBLICATIONS

Amodei et al., "Deep speech 2:End-to-End speech recognition in English and Mandarin," arXiv preprint arXiv:1512.02595, 2015 (28 pgs).

Xiong et al.,"Achieving human parity in conversational speech recognition," arXiv preprint arXiv preprint arXiv:1610.05256, 2017. (13 pgs).

Zhang et al.,"Deep learning for environmentally robust speech recognition: An overview of recent developments," arXiv preprint arXiv:1705.10874, 2017.(14 pgs).

Benzeghiba et al.,"Automatic speech recognition and speech variability: A review," Speech Commun., vol. 49, No. 10-11, pp. 763-786, 2007. (27 pgs).

Goodfellow et al.,"Generative Adversarial Nets," In NIPS Proceedings, 2014. (9 pgs).

Bandanau et al.,"End-to-end attention-based large vocabulary speech recognition," arXiv preprint arXiv:1508.04395, 2016. (8 pgs).

Nakatani et al.,"Speech dereverberation based on variance-normalized delayed linear prediction," IEEE Transactions on Audio, Speech, and Language Processing, [online], [Retrieved Sep. 18, 2019]. Retrieved from Internet <URL: https://ieeexplore.ieee.org/document/5547558>, 2010. (2 pgs).

Yoshioka et al.,"Generalization of multichannel linear prediction methods for blind mimo impulse response shortening," IEEE Transactions on Audio,Speech, Language Processing, [online], [Retrieved Sep. 18, 2019]. Retrieved from Internet <URL: https://ieeexplore.ieee.org/document/6255769>, 2012. ( 2 pgs).

Thiollire et al.,"A hybrid dynamic time warping-deep neural network architecture for unsupervised acoustic modeling," in Interspeech, pp. 3179-3183, ISCA, 2015. (5pgs).

Bousmalis et al.,"Using simulation and domain adaptation to improve efficiency of deep robotic grasping," arXiv preprint arXiv:1709.07857, 2017. (9pgs).

Arjovsky et al.,"Wasserstein generative adversarial networks," in Proceedings of the 34th International Conference on Machine Learning, 2017. (24 pgs).

Pascual et al.,"SEGAN: speech enhancement generative adversarial network," arXiv preprint arXiv:1703.09452, 2017. (5pgs).

Ko et al.,"A study on data augmentation of reverberant speech for robust speech recognition," [online], [Retrieved Sep. 19, 2019]. Retrieved from Internet <URL: http://danielpovey.com/files/2017_icassp_reverberation.pdf>, 2017. (5pgs).

Battenberg et al.,"Exploring neural transducers for end-toend speech recognition," arXiv preprint arXiv:1707.07413, 2017. (8pgs).

Maas et al.,"Rectifier nonlinearities improve neural network acoustic models," in Proceedings of the 30th International Conference on Machine Learning, 2013. (6pgs).

Ioffe et al.,"Batch normalization:Accelerating deep network training by reducing internal covariate shift," arXiv preprint arXiv:1502.03167, 2015. (11 pgs).

Serdyuk et al.,"Invariant Representations for Noisy Speech Recognition," arXiv preprint arXiv:1612.01928, 2016. (5 pgs).

Search Report and Written Opinion, dated Feb. 14, 2019, in European Patent Application No. 18202915.7-1210. (8pgs).

Anuroop Sriram et al.,"Robust Speech Recognition Using Generative Adversarial Networks," arXiv preprint arXiv:1711.01567, 2017. (5pgs).

Anuroop Sriram et al.,"Robust Speech Recognition Using Generative Adversarial Networks," In IEEE, 2018. (5pgs).

Ian Goodfellow, "Generative Adversarial Networks," arXiv preprint arXiv:1701.00160, 2017. (57pgs).

Tom Young et al.,"Recent Trends in Deep Learning Based Natural Language Processing," arXiv preprint arXiv:1708.02709, 2018. (30pgs).

Communication pursuant to Article 94(3) EPC, dated Nov. 26, 2019, in European Patent Application No. 18202915.7-1210. (5pgs).

Li et al.,"Acoustic modeling for google home," Interspeech, 2017. (5pgs).

Kim et al.,"Generation of large-scale simulated utterances in virtual rooms to train deep-neural networks for far-field speech recognition in google home," Interspeech, 2017. (5 pgs).

Vincent et al.,"Stacked denoising autoencoders: Learning useful representations in a deep network with a local denoising criterion," Journal of Machine Learning Research 3371-3408, 2010. (38pgs).

Mimura et al.,"Reverberant speech recognition combining deep neural networks and deep autoencoders augmented with a phone-class feature," EURASIP Journal on Advances in Signal Processing, vol. 2015, No. 1, pp. 62, Jul. 2015. (14 pgs).

Ravanelli et al.,"A network of deep neural networks for distant speech recognition," arXiv preprint arXiv:1703.08002, 2017. (5pgs).

Hadsell et al.,"Dimensionality reduction by learning an invariant mapping," In Proc. Computer Vision and Pattern Recognition Conference (CVPRO6. 2006, IEEE Press. (8pgs).

* cited by examiner

400

```
┌─────────────────────────────────────────────────────┐
│ Determine a gradient of average CE loss with        │── 405
│ respect to the seq-to-seq model weights             │
└─────────────────────────────────────────────────────┘
                          ↓
┌─────────────────────────────────────────────────────┐
│ Update the seq-to-seq-model weights using the       │── 410
│ determined average CE loss gradient                 │
└─────────────────────────────────────────────────────┘
                          ↓
┌─────────────────────────────────────────────────────┐
│ Determine a gradient of average EM loss with        │── 415
│ respect to the critic weights                       │
└─────────────────────────────────────────────────────┘
                          ↓
┌─────────────────────────────────────────────────────┐
│ Update the critic weights using the determined      │── 420
│ average EM loss                                     │
└─────────────────────────────────────────────────────┘
                          ↓
┌─────────────────────────────────────────────────────┐
│ Clip the updated critic weights to a range defined  │── 425
│ by a predetermined clipping parameter               │
└─────────────────────────────────────────────────────┘
                          ↓
┌─────────────────────────────────────────────────────┐
│ Repeat above steps for a predetermined number of    │── 430
│ iterations to set critic weights per seq-to-seq     │
│ model iteration                                     │
└─────────────────────────────────────────────────────┘
                          ↓
┌─────────────────────────────────────────────────────┐
│ Determine a gradient of a combination of average    │── 435
│ CE losses and average EM distance with respect to   │
│ seq-to-seq weights                                  │
└─────────────────────────────────────────────────────┘
                          ↓
┌─────────────────────────────────────────────────────┐
│ Update the seq-to-seq-model weights using the       │── 440
│ determined gradient of the combination of CE loss   │
│ and EM distance                                     │
└─────────────────────────────────────────────────────┘
```

FIG. 4

SYSTEMS AND METHODS FOR ROBUST SPEECH RECOGNITION USING GENERATIVE ADVERSARIAL NETWORKS

CROSS-REFERENCE TO RELATED APPLICATION

This application claims the priority benefit under 35 USC § 119(e) to U.S. Prov. Pat. App. Ser. No. 62/578,102, entitled "ROBUST SPEECH RECOGNITION USING GENERATIVE ADVERSARIAL NETWORKS", and listing Anuroop Sriram, Hee Woo Jun, Yashesh Gaur, and Sanjeev Satheesh as inventors. The aforementioned patent document is incorporated by reference herein in its entirety.

BACKGROUND

Automatic speech recognition (ASR) is becoming increasingly more integral in people's day-to-day lives, enabling virtual assistants and smart speakers like Siri, Google Now, Cortana, Amazon Echo, Google Home, Apple HomePod, Microsoft Invoke, Baidu Duer, and many more. While ASR performance has improved tremendously in recent, these models still suffer considerable degradation from reasonable variations in reverberations, ambient noise, accents and Lombard reflexes that humans have little or no issue recognizing.

Most of these problems can be mitigated by training the models on a large volume of data that exemplify these effects. However, in the case of non-stationary processes, such as accents, accurate data augmentation is most likely infeasible, and in general, collecting high quality datasets can be expensive and time-consuming. Hand-engineered front-ends and data-driven approaches have been considered in an attempt to increase the value of relatively parsimonious data with desired effects. While these techniques are quite effective in their respective operating regimes, they do not generalize well to other modalities in practice due to the aforementioned reasons. Namely, it is difficult to model anything beyond reverberation and background noise from the first principles. Existing techniques do not directly induce invariance for ASR or are not scalable. And, due to the sequential nature of speech, alignments are needed to compare two different utterances of the same text.

Accordingly, what is needed are systems and methods that can overcome these deficiencies.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

Figure ("FIG.") 1 depicts architecture of a sequence-to-sequence model with encoder distance enhancer, according to embodiments of the present disclosure.

FIG. 4 depicts a process to update seq-to-seq model parameters during the training process, in accordance with embodiments of the present disclosure.

DETAILED DESCRIPTION OF EMBODIMENTS

Figure 1:
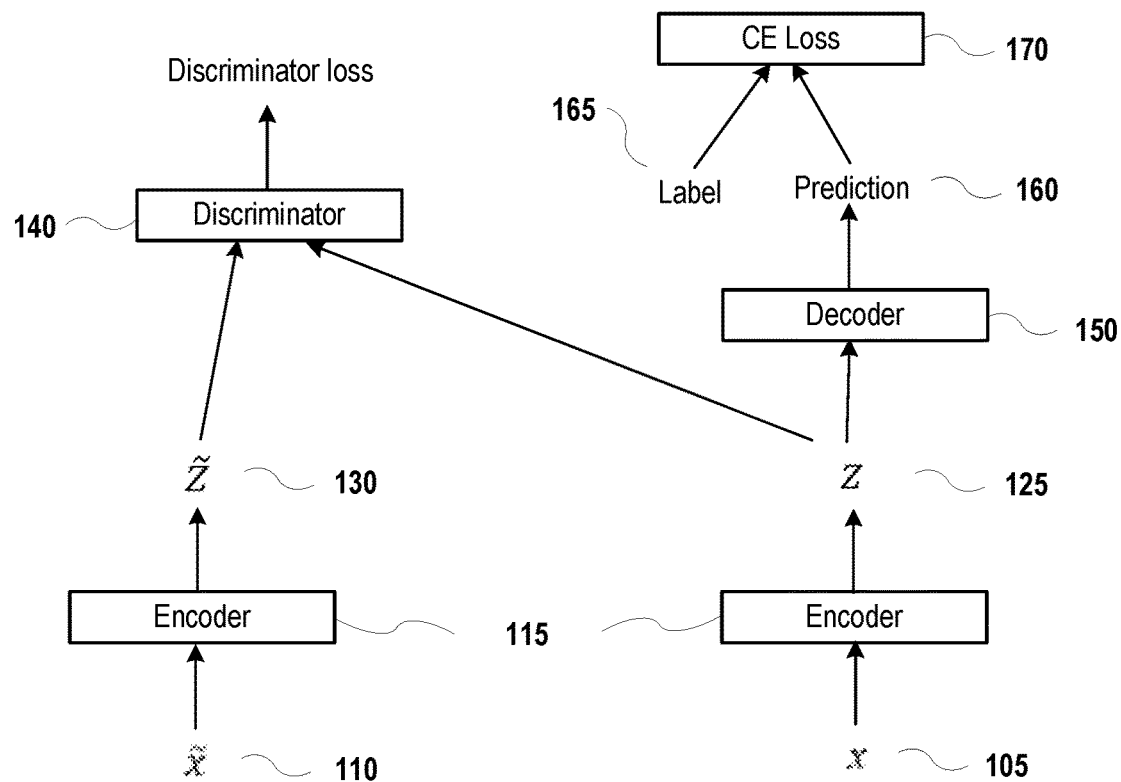

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that experiments and results provided herein are provided by way of illustration and were performed under specific conditions using a specific embodiment or embodiments; accordingly, neither these experiments nor their results shall be used to limit the scope of the disclosure of the current patent document.

A. GENERAL INTRODUCTION

Presented herein are systems and methods that employ embodiments of a generative adversarial network (GAN) framework to increase the robustness of seq-to-seq models in a scalable, end-to-end fashion. An encoder component is treated as the generator of GAN and is trained to produce indistinguishable embeddings between noisy and clean audio samples. Because no restricting assumptions are made, this new robust training approach can learn to induce robustness without alignment or complicated inference pipeline and even where augmentation is not possible. An encoder distance objective was also experimented upon to explicitly restrict the embedding space and demonstrate that achieving invariance at the hidden representation level is a promising direction for robust ASR.

This patent document is organized as follows. Some related work is presented in Section B. Section C defines notations and details embodiments of a robust ASR GAN. Section D explains the experimental setup. Section E shows results on the Wall Street Journal (WSJ) dataset with simulated far-field effects. Some conclusions are found in Section G.

B. RELATED WORK

Robust ASR has fairly deep roots in signal processing, but these traditional approaches typically have strong priors that make it difficult to incorporate new effects. Methods like the denoising autoencoder (DAE) on the other hand may learn to recover the original audio from a corresponding noisy version without domain knowledge. Such methods have been shown to improve perceptual quality of the produced speech and to a certain extent the final ASR performance. Even though gain in ASR performance from DAE is rather limited given its amount of computation, its data driven nature is very appealing.

One problem with autoencoders is that it attempts to reconstruct all aspects of the original audio, including many features that are not important for the end task, such as the voice and accent of the speaker, background noises, etc. In fact, ASR systems learn to remove such artifacts of the input audio as they can hinder speech recognition performance.

This problem can be alleviated by training models with an auxiliary objective that measures sensitivity to changes in the bottleneck layer. Intuitively, the ASR is expected model to learn robust representations suitable for the end task automatically from data. One such heuristic is the embedding distance between clean and noisy speech but minimizing this requires paired training audio and alignments. Variable speed may make alignments even trickier; expensive methods like dynamic time warping may be needed.

The domain adversarial neural network (DANN) solves this problem by minimizing the domain divergence. This involves introducing a secondary task of classifying between source and target domains, and training the feature extractors to produce embeddings that are indistinguishable by the classifier. Because the objective can be computed from a scalar summary of the input and the domain label, such methods may leverage unaligned, unpaired, and unsupervised data. This technique has been demonstrated in improving ASR robustness to ambient noise.

Similarly, generative adversarial networks (GAN) may be used to enable robust ASR. In a GAN, a generator synthesizes increasingly more realistic data in attempt to fool a competing discriminator. Encoding speech may be treated as a generative process and invariance may be achieved by confusing the domain critic. Multi-task adversarial learning certainly enhances ASR robustness in a data-driven way, but existing work is applied to a more traditional hybrid speech recognition pipeline. They are unable to take advantage of more recent end-to-end frameworks like sequence-to-sequence models with attention.

In general, adversarial methods are quite difficult to train. It has been noted that the Jensen-Shannon divergence's strong topology makes gradients not always useful. Instead, Wasserstein distance, also known as the Earth-Mover distance, was proposed to mitigate unstable training. This method may make GAN training more robust to architectural choices.

C. ROBUST ASR EMBODIMENTS

1. Encoder Distance Enhancer Embodiments

As explained in Section B, inducing invariant representations to noise via multitask learning naturally improves ASR robustness. The end task objective ensures that only relevant features to recognition are learned, while a sensitivity measure encourages perturbed representations to be similar to those of clean samples. A straight-forward heuristic that measures the distance between clean and noisy encoder embeddings is disclosed. Based on this idea, new framework embodiments for robust speech recognition that try to match the output of the encoder for clean audio and noisy audio are presented herein.

FIG. 1 depicts architecture of a sequence-to-sequence ASR model with encoder distance enhancer introduced herein, according to embodiments of the present disclosure. A encoder g (115), is applied to an audio input x (105) labeled with ground-truth label or transcription y (165) to produce a first hidden state (125) $z=g(x)$. The same encoder 115 is applied to an unlabeled audio $\tilde{x}$ (110) to produce a second hidden state (130) $\tilde{z}=g(\tilde{x})$. In one or more embodiments, the unlabeled audio 110 is corresponding to the labeled audio input 105. A decoder h (150) models the conditional probability $p(y|x)=p(y|z)=h(z)$ using the first hidden state z (125) and outputs a predicted text sequence 160 one character at a time. The predicted text sequence 160 and the ground-truth label or transcription 165 are used to generate a cross-entropy (CE) loss 170, which is used for training the ASR model. A discriminator 140 receives the first hidden state 125 and the second hidden state 130 to generate a discriminator loss 145 based on the first hidden state 125 and the second hidden state 130.

In one or more embodiments, the discriminator loss is $L^1$-distance or WGAN loss. In one or more embodiments, the entire model is trained end-to-end using both the discriminator loss and the cross-entropy (CE) loss. In one or more embodiments, the entire system is trained end-to-end using a multitask objective that tries to minimize the cross-entropy loss of predicting y from x and a discriminator loss.

If the normalized $L^1$-distance between z and ž is used, the discriminator loss may be formulated as:

$$\mathbb{E}_{x,\tilde{x}}\left[\lambda \frac{\|g(x) - g(\tilde{x})\|_1}{\|g(x)\|_1 + \|g(\tilde{x})\|_1 + \epsilon}\right] \quad (1)$$

where $\in$ is added random Gaussian noise, λ is a parameter to determine the weight of $L^1$-distance in equation (1). In one or more embodiments, E is a small constant, e.g. $1 \times 10^{-6}$, added in the denominator to prevent the occurrence of division by zero. When normalized $L^1$-distance is used, the term in equation (1) is added to the cross entropy (CE) loss for model training. The cross entropy (CE) loss may be calculated using any labeled datasets.

In one or more embodiments, the audio input 105 labeled with ground-truth transcription is a clean audio input, while the unlabeled audio input 110 may be related to the audio input 105 and augmented with various noises, or made with near-field or far-field audio examples simulated from the audio input 105 or the ground-truth transcription. The unlabeled audio input 110 may also be drawn from a different modality. In one or more embodiments, the unlabeled audio input 110 is a clean audio, while the labeled audio input 105 is augmented from the clean audio or drawn from a different modality.

In one or more embodiments, a Room Impulse Response (RIR) convolution may be used to simulate far-field audio. It is also possible to train this model with the same speech recorded in different conditions.

2. GAN Enhancer Embodiments

In experiments, it was found that the encoder distance penalty yielded excellent results, but it has the disadvantage that the encoder content between clean and noisy audio has to match frame for frame. Instead, by employing the GAN framework, a discriminator may output a scalar likelihood of the entire speech being clean, and the encoder may be trained to generate embeddings that are indistinguishable by the discriminator.

Figure 2:
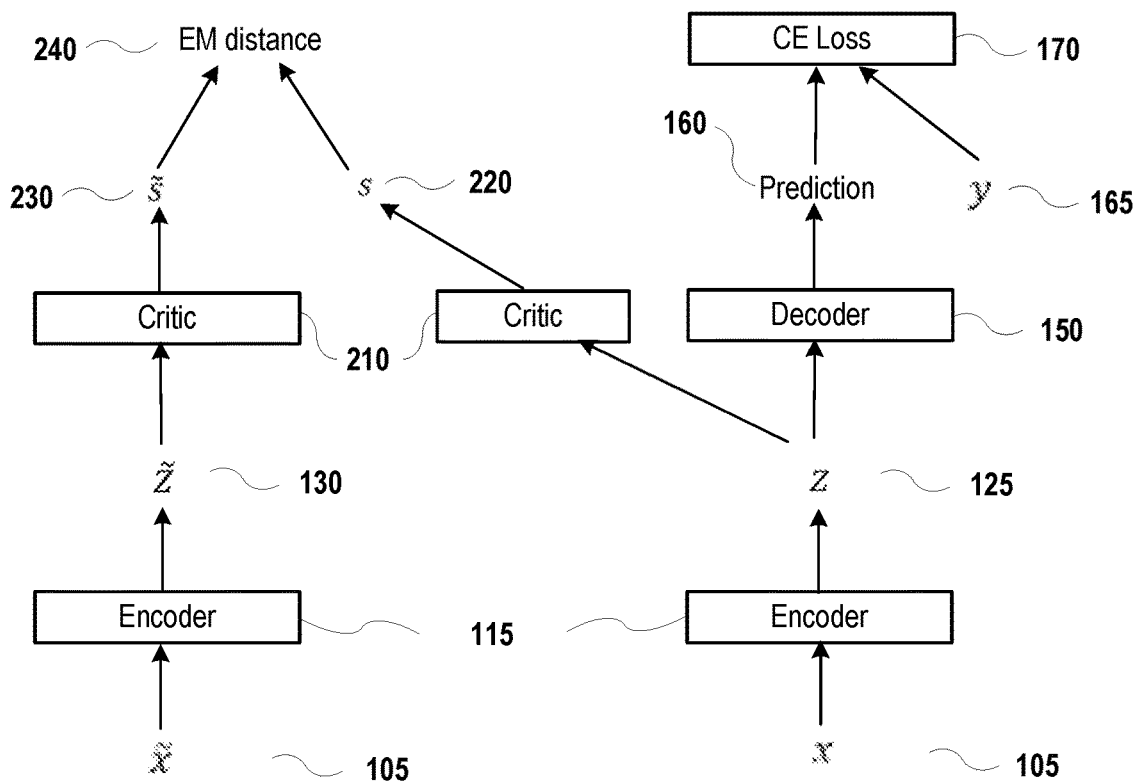
FIG. 2 depicts architecture of a sequence-to-sequence (seq-to-seq) model with Wasserstein generative adversarial network (WGAN) enhancer, in accordance with embodiments of the present disclosure.

In one or more embodiments, Wasserstein GAN (WGAN) is used. FIG. 2 depicts architecture of a sequence-to-sequence model with WGAN enhancer, in accordance with embodiments of the present disclosure. The overall architecture in FIG. 2 is similar to the architecture depicted in FIG. 1, except that an Earth-Mover (EM) distance is used to replace the $L^1$-distance shown in equation (1). As shown in FIG. 2, a critic f (210), is employed to output a first scalar score s (220) of the first hidden state z (125) and a second scalar score š (230) of the second hidden state ž (130) respectively. The first scalar score s (220) and the second scalar score š (230) are then used to determine the EM distance 240.

Following the notations of WGAN, the seq-to-seq model and the critic shown in FIG. 2 are parameterized with θ (for the encoder and the decoder) and w (for the critic), respectively. The encoder distance in Equation (1) is replaced with a dual of Earth-Mover (EM) distance, a distance between probability measures:

$$\max_{w \in \mathcal{W}} \{\mathbb{E}_x[f_w(g_\theta(x))] - \mathbb{E}_{\tilde{x},\varepsilon}[f_w(g_\theta(\tilde{x} + \varepsilon))]\} \quad (2)$$

wherein $\mathcal{W}$ is a set of clipped weights to ensure the duality holds up to a constant multiple. In one or more embodiments, the embedding of the clean input x is treated as real data and the embedding of x̃, which may either be augmented from x or drawn from a different modality, is treated as being fake. And so, as GAN training progresses, the encoder $g_\theta$ should learn to remove extraneous information to ASR to be able to fool the discriminator. In one or more embodiments, a random Gaussian noise ε is included to the input prior of the encoder, treated as the generator for the GAN, to help improve training. Also, weights in the parameter set $\mathcal{W}$ should be clipped to ensure the duality of Equation (2) hold up to a constant multiple. In one or more embodiments, an adapted WGAN training procedure is detailed in Methodology 1.

Methodology 1:

WGAN enhancer training. The seq-to-seq model was trained using the Adam optimizer in experiments. In one or more embodiments, if x̃ may be generated from x, data augmentation may also be used to update the seq-to-seq model in lines 6 and 15 in Methodology 1 to further improve results.

Data: $n_{critic}$, the number of critic per robust ASR updates. c, the clipping parameter. m, m', the batch sizes.

```
while θ has not converged do                                              1
| for t =1,..., n_critic do                                               2
| | Sample {(x^(i), y^(i))~𝒟}_{i=1}^m a batch of labeled speech data.     3
| | Sample {x̃^(i)}_{i=1}^{m'} by augmentation or from a noisy dataset.   4
| | Sample noise {ε^(i)}_{i=1}^{m'}.                                      5
| |                                                                        6
```

$$g_\theta \leftarrow \nabla_\theta \left[\frac{1}{m}\sum_{i=1}^{m} CE(h_\theta(g_\theta(x^{(i)})), y^{(i)})\right]$$

```
| | θ ← θ - Optimizer(θ, g_θ)                                             7
| |                                                                        8
```

$$g_w \leftarrow \nabla_w \left[\frac{1}{m}\sum_{i=1}^{m} f_w(g_\theta(x^{(i)})) - \frac{1}{m'}\sum_{i=1}^{m'} f_w(g_\theta(\tilde{x}^{(i)} + \varepsilon^{(i)}))\right]$$

```
| | w ← w + RMSProp(w, g_w)                                               9
| | w ← clip(w, -c, c)                                                   10
| end                                                                    11
| Sample {(x^(i), y^(i))~𝒟}_{i=1}^m a batch of labeled speech data.      12
| Sample {x̃^(i)}_{i=1}^{m'} by augmentation or from a noisy dataset.    13
| Sample noise {ε^(i)}_{i=1}^{m'}.                                       14
|                                                                        15
```

$$g_\theta \leftarrow \nabla_\theta \left[\frac{1}{m}\sum_{i=1}^{m} CE(h_\theta(g_\theta(x^{(i)})), y^{(i)}) - \lambda \frac{1}{m'}\sum_{i=1}^{m'} [f_w(g_\theta(\tilde{x}^{(i)} + \varepsilon^{(i)}))]\right]$$

```
| θ ← θ - Optimizer(θ, g_θ)                                              16
end                                                                      17
```

Figure 3:
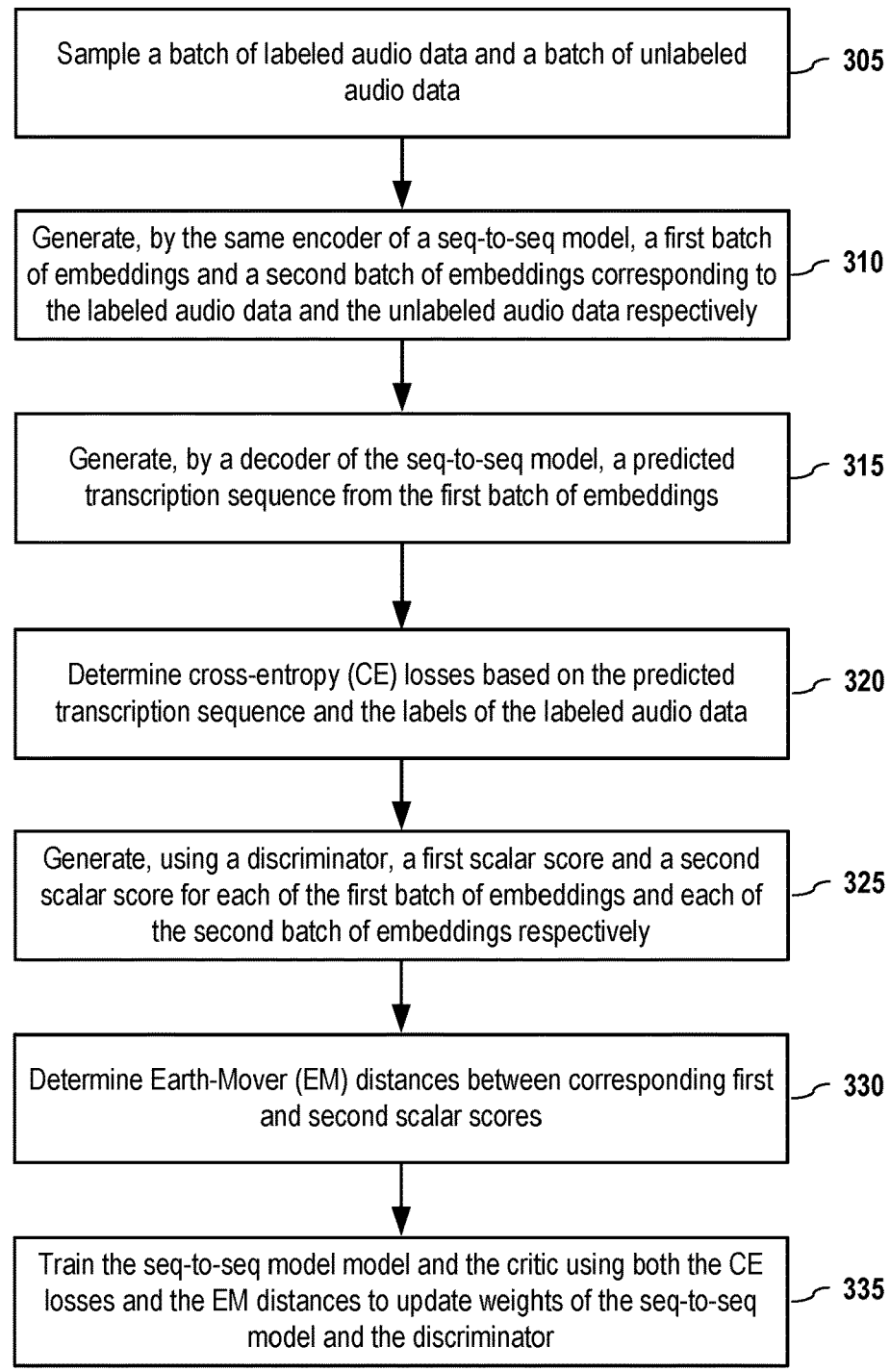
FIG. 3 depicts a process to train a seq-to-seq model end-to-end using the WGAN framework for speech recognition, in accordance with embodiments of the present disclosure.

FIG. 3 depicts a process to train a seq-to-seq model end-to-end using the WGAN framework to increase the robustness of the model in speech recognition, in accordance with embodiments of the present disclosure. In step 305, a batch of labeled audio data and a batch of unlabeled audio data are sampled. The unlabeled audio data may be related to the labeled audio data, e.g. augmented with various noises, or made with near-field or far-field audio examples simulated from the labeled audio or the ground-truth transcription of the labeled audio. The unlabeled audio may also be from a different distribution. In one or more embodiments, the unlabeled audio data may incorporate a batch of random Gaussian noise, which was found helpful in improving training in practice. In step 310, the same encoder of a seq-to-seq model generates both a first batch of embeddings and a second batch of embeddings corresponding to the labeled audio data and the unlabeled audio data respectively.

In step 315, the first batch of embeddings is used to generate, by a decoder of the seq-to-seq model, a predicted transcription sequence. In step 320, the predicted transcription sequence and labels of the labeled audio data are used to determine cross-entry (CE) losses. In step 325, a discriminator generates a first scalar score and a second scalar score for each of the first batch of embeddings and each of the second batch of embeddings, respectively. In one or more embodiments, the discriminator is a critic, which specifically refers to a discriminator for a WGAN. In step 330, Earth-Mover (EM) distances are determined between first and second scalar scores. The critic is configured to maximize the EM distances, while the encoder is configured to minimize the EM distances to "fool" the critic. In step 335, both the CE losses and the EM distances are used to train the seq-to-seq model and the discriminator to update weights of the seq-to-seq model and the discriminator. In one or more embodiments, the CE losses and the EM distances are used in weight combination with weight of the EM distances determined by a weight parameter ($\lambda$). In one or more embodiments, weight parameter ($\lambda$) is turned over a dev set by doing a logarithmic sweep in a range, such as [0.01, 10]. In one or more embodiments, $\lambda=1$ gave the best performance.

Various implementations may be utilized to update weights of the seq-to-seq model and the discriminator using both CE losses and EM distances. FIG. 4 depicts a process to update seq-to-seq model parameters during the training process after the CE losses and EM distances obtained, in accordance with embodiments of the present disclosure. The process in FIG. 4 may be implemented via the aforementioned Methodology 1. In step 405, a gradient of the average of the CE losses with respect to seq-to-seq model weights is obtained, as shown in line 6 of Methodology 1. In step 410, the gradient of the average of the CE losses is used to update seq-to-seq model weights, as shown in line 7 of Methodology 1. Various methods may be used for this update step. In one or more embodiments, Adam (adaptive moment estimation) optimization may be used to update seq-to-seq model weights. In step 415, a gradient of the average of the EM distances with respect to discriminator weights, e.g. critic weights, is obtained, as shown in line 8 of Methodology 1. In step 420, the gradient of the average of the EM distances is used to update seq-to-seq model weights, as shown in line 9 of Methodology 1. Various methods may be used for this update step. In one or more embodiments, RMSProp (for Root Mean Square Propagation) optimization may be used to update critic weights, in which learning rate is adapted for each of the critic weights. In step 425, the updated critic weights are clamped to a small window defined by a predetermined clipping parameter c, as shown in line 10 of Methodology 1. In one or more embodiments, the above steps are repeated in step 430 until a predetermined number of critic iterations is reached to set critic weights. In step 435, a gradient with respect to the seq-to-seq model weights of a combination of average CE losses and average of EM distances generated from a second batch of labeled audio data and a second batch of unlabeled audio data is determined, as shown in line 15 of Methodology 1. In one or more embodiments, the second batch of labeled audio data is the same as the first batch of labeled audio data, while the second batch of unlabeled audio data may or may not be the same as the first batch of unlabeled audio data. The EM distances are generated with the set critic weights. In one or more embodiments, the combination of the CE losses and the EM distances is a weight combination with weight of the EM distances determined by a weight parameter ($\lambda$). In step 440, the seq-to-seq model weights are updated using the determined gradient of a combination of average CE losses and average of EM distances with respect to the seq-to-seq model weights, as shown in line 16 of Methodology 1. The overall above steps, which are also illustrated in FIG. 4, constitute one iteration of training a robust seq-to-seq model. In one or more embodiments, this large "iteration" may be repeated tens of thousands to hundreds of thousands of times.

D. EMBODIMENTS OF EXPERIMENTAL SETUP

1. Corpora and Tasks

One or more embodiments of the enhancer framework were evaluated on the Wall Street Journal (WSJ) corpus with simulated far-field effects. The dev93 and eval92 sets were used for hyperparameter selection and evaluation, respectively. The reverberant speech was generated with room impulse response (RIR) augmentation, with each audio convolved with a randomly chosen RIR signal. The clean and far-field audio durations were kept the same with valid convolution so that the encoder distance enhancer can be applied. 1088 impulse responses were collected, using a linear array of 8 microphones, 120 and 192 of which were held out for development and evaluation. The speaker was placed in a variety of configurations, ranging from 1 to 3 meters distance and 60 to 120 degrees inclination with respect to the array, for 20 different rooms. Mel spectrogram of 20 milliseconds samples with 10 milliseconds stride and 40 bins was used as input features to all baseline and enhancer model embodiments.

2. Network Architecture Embodiments

Figure 5:
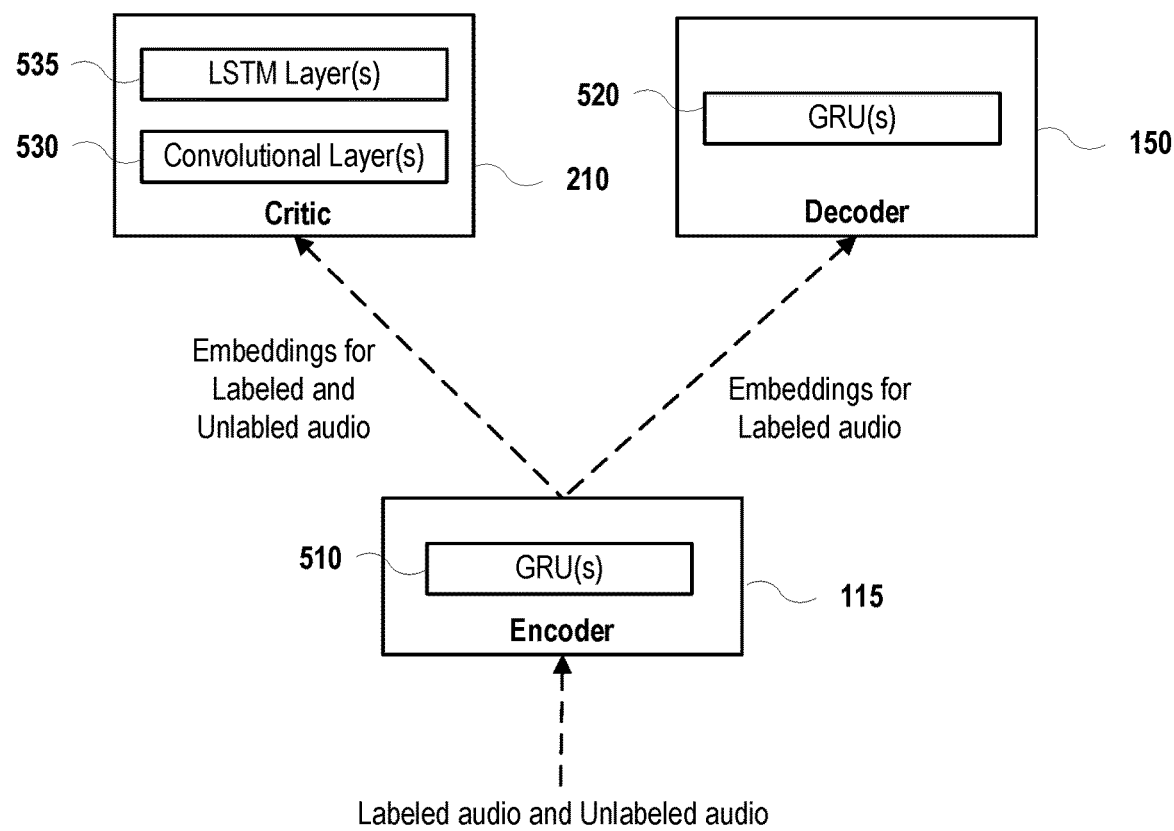
FIG. 5 depicts network architecture of the WGAN framework, in accordance with embodiments of the present disclosure.

FIG. 5 depicts network architecture of the GAN framework, in accordance with embodiments of the present disclosure. The GAN framework comprises an encoder 115, a decoder 150 and a critic 210. In one or more embodiments, for the acoustic model (comprising the encoder and the decoder), the sequence-to-sequence framework with an attention mechanism, e.g. soft attention, was used. The encoder 115 and the decoder 150 may each comprise one or more gated recurrent unit (GRU) layers 510 and 520 respectively. The critic may comprise one or more convolutional layers 530 and one or more long short-term memory (LSTM) layers 535. One encoder architecture embodiment is described in Table 1. In one or more embodiments, the decoder comprises a single 256-dimensional GRU layer 520 with an attention mechanism to allow the model to attend anywhere in the input sequence at each time, and thus the alignments can be non-local and non-monotonic. The attention mechanism in the GRU layer 520 may be a location-aware hybrid attention mechanism similar to the models described by Eric Battenberg et al. (Exploring neural transducers for end-to-end speech recognition, CoRR, vol. abs/1707.07413, 2017. which is incorporated by reference herein in its entirety and for all purposes).

TABLE 1

| Architecture of the encoder |
| --- |
| Bidirectional GRU (dimension = 256, batch norm) |
| Bidirectional GRU (dimension = 256, batch norm) |
| Bidirectional GRU (dimension = 256, batch norm) |
| Pooling (2 × 1 striding) |
| Bidirectional GRU (dimension = 256, batch norm) |
| Pooling (2 × 1 striding) |

TABLE 1-continued

Architecture of the encoder

Bidirectional GRU (dimension = 256, batch norm)
Pooling (2 × 1 striding)
Bidirectional GRU (dimension = 256, batch norm)
Mel spectrogram One embodiment of the discriminator network of the WGAN enhancer is described in Table 2. In one or more embodiments, all convolutional layers use leaky ReLU activation with 0.2 slope for the leak, and batch normalization.

TABLE 2

Architecture of the critic. (feature) × (time)

Mean pool of likelihood scores
Sigmoid
Linear projection to per-time step scalar
Bidirectional LSTM (dimension = 32)
3 × 3 Convolution, 96 filters, 1 × 1 striding
3 × 3 Convolution, 64 filters, 2 × 1 striding
Bidirectional LSTM (dimension = 32)
3 × 3 Convolution, 64 filters, 2 × 1 striding
7 × 2 Convolution, 32 filters, 5 × 1 striding
Encoder States 3. Training Examples It shall be noted that these training experiments and results are provided by way of illustration and were performed under specific conditions using a specific embodiment or embodiments; accordingly, neither these training experiments nor their results shall be used to limit the scope of the disclosure of the current patent document. For example, by way of illustration and not limitation, embodiments of the present invention are not bound to the implementation options chosen for these examples provided herein; but rather, one skilled in the art shall recognize that other implementation choices may be made without departing from the true spirit and scope of the present disclosure.

To establish a baseline, in the first experiment, a simple attention based seq-to-seq model was trained. All the seq-to-seq networks in the experiments with the exception of WGAN critic were trained using the Adam optimizer. All models were evaluated on both clean and far-field test sets.

To study the effects of data augmentation in the training, a new seq-to-seq model was trained with the same architecture and training procedure as the baseline. However, this time, in each epoch, 40% of the training utterances were randomly selected and the training RIRs were applied to them (in the previous experiments it was observed that 40% augmentation results in the best validation performance).

In one or more embodiments, for the enhancer models, $\lambda$ in Equation 1 was tuned over the dev set by doing a logarithmic sweep in [0.01, 10]. $\lambda=1$ gave the best performance.

In one or more embodiments, Methodology 1 was used to train the WGAN enhancer. The clipping parameter was 0.05 and $\epsilon$ was random normal with 0.001 standard deviation. It was found that having a schedule for $n_{critic}$ was important. In one or more embodiments, the encoder parameters were not updated with WGAN gradients for the first 3000 steps. Then, the normal $n_{critic}=5$ was used. It is thought that the initial encoder embedding is of poor quality and encouraging invariance at this stage through the critic gradients significantly hinders seq-to-seq training.

E. RESULTS

It shall be noted that these experiments and results are provided by way of illustration and were performed under specific conditions using a specific embodiment or embodiments; accordingly, neither these experiments nor their results shall be used to limit the scope of the disclosure of the current patent document.

Results are presented in Table 3. All of the evaluations were performed using the Eval92 and held-out test impulse response set with greedy decoding.

TABLE 3

Speech recognition performance on the
Wall Street Journal (WSJ) corpus

| Model | Near-Field | | Far-Field | |
|---|---|---|---|---|
| | CER | WER | CER | WER |
| seq-to-seq | 7.43% | 21.18% | 23.76% | 50.84% |
| seq-to-seq + Far-field augmentation | 7.69% | 21.32% | 12.47% | 30.59% |
| seq-to-seq + $L^1$-distance Penalty | 7.54% | 20.45% | 12.00% | 29.19% |
| seq-to-seq + WGAN enhancer | 7.78% | 21.07% | 11.26% | 28.12% |

To provide context, near-field result of the present disclosure is comparable to 18.6% WER obtained with a language model beam decoding with 200 beam size. It can be seen that a seq-to-seq model trained only on near-field audio data performs extremely poorly on far-field audio. This suggests that it is non-trivial for an ASR model to generalize from homogeneous near-field audio to far-field audio.

To overcome this, a stronger baseline was trained with simulated far-field audio examples. This model had the same architecture but 40% of the examples that the model was trained on were convolved with a randomly chosen room impulse response during training. It can be seen from Table 3 that simple data augmentation can significantly improve performance on far-field audio without compromising the performance on near-field audio, implying that the presented seq-to-seq model is capable of modeling far-field speech to a certain extent.

Even with data augmentation, however, there is still a large gap between near-field and far-field test performances. An $L^1$-distance penalty can lower the test set WER by 1.32% absolute. Using a GAN enhancer can reduce the WER by an additional 1.07%. Overall, the gap between near-field and far-field performance decreases by almost 27% compared to the model that only uses data augmentation.

A benefit of multi-task learning that constrains the encoder space is that the new objectives act as regularizers and improve near-field performance as well. Models trained only with far-field augmentation suffer a slight deterioration on near-field speech, as the support of input distribution to be modeled has increased but there is no mechanism to learn an efficient representation that exploits commonalities in the input. It is also shown that there was some initial improvement during training by adding Gaussian noise. The WGAN enhancer model most likely benefited from input perturbations because it alleviates critic overfitting.

In experiments presented in this disclosure, the encoder was never quite able to produce fully indistinguishable embeddings that can fool the discriminator. It is suspected that the encoder's ability to generate invariant representations is limited by the lack of a specialized front-end or more flexible layer that can fully remove far-field effects. Grid LSTMs, which have been shown to have better model frequency variations than GRU or LSTM, may be used to further close the gap.

F. SYSTEM EMBODIMENTS AND IMPLEMENTATIONS

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 6:
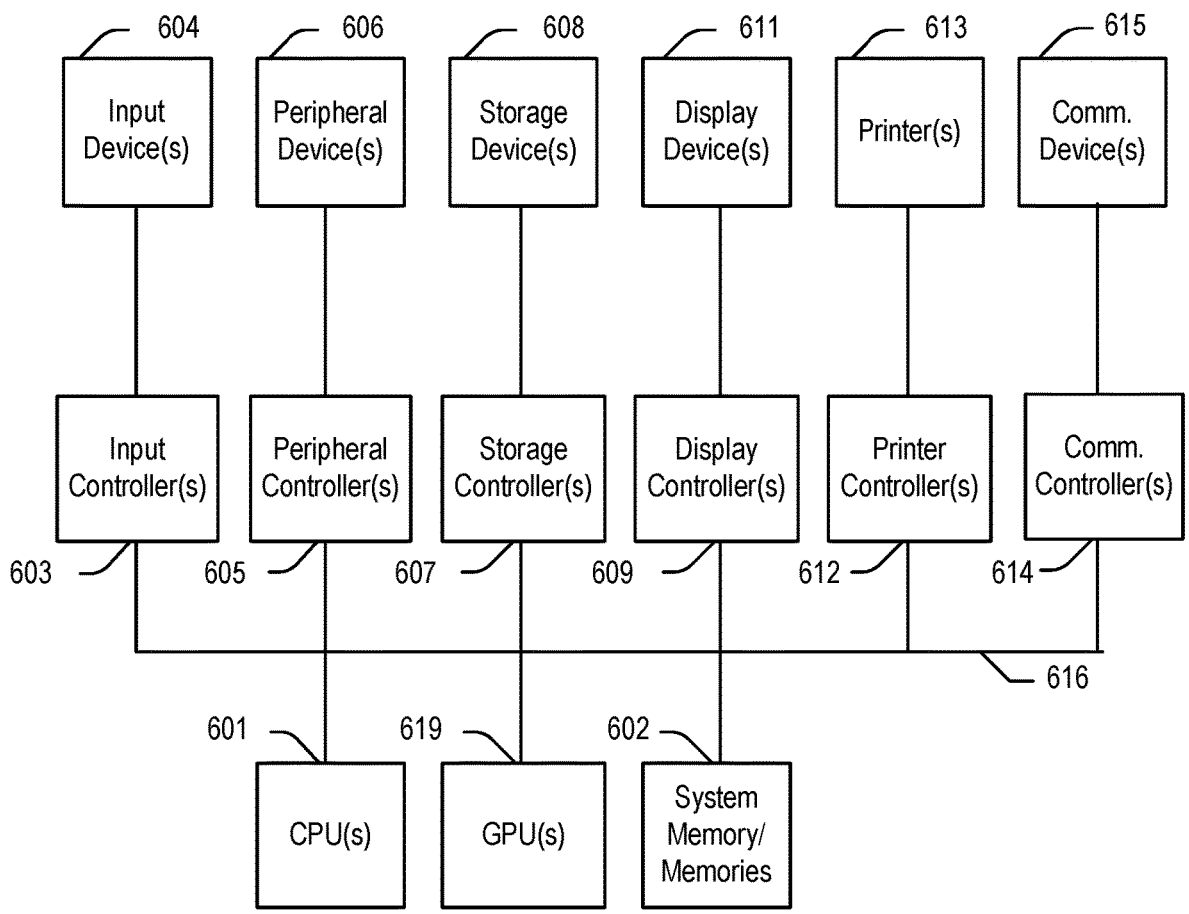
FIG. 6 depicts a simplified block diagram of a computing device/information handling system, in accordance with embodiments of the present disclosure.

FIG. 6 depicts a simplified block diagram of a computing device/information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present invention. Storage device(s) 608 may also be used to store processed data or data to be processed in accordance with the invention. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

G. SOME CONCLUSIONS

Presented herein were GAN-based framework embodiments to train robust ASR models in a scalable, data-driven way. It was also shown that inducing invariance to noise at the encoder improves speech recognition robustness. In one or more embodiments, the Wasserstein distance is used to train a robust seq-to-seq ASR model embodiment. Because this loss does not require alignments, the disclosed methodologies may be applied to problems where there are unpaired and unsupervised audio data. It should be noted that coupling an embodiment of this new framework with hand-engineered or more expressive layers would enhance robustness even more significantly.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a sequence-to-sequence (seq-to-seq) model using a generative adversarial network (GAN), the method comprising:
   receiving, at an encoder of the seq-to-seq model, a batch of labeled audio data, the labeled audio data associated with corresponding ground-truth transcription sequence;
   receiving, at the encoder, a batch of unlabeled audio data;
   generating, by the encoder, a first batch of embeddings corresponding to the labeled audio data;
   generating, by using the encoder as a generator of the GAN, a second batch of embeddings corresponding to the unlabeled audio data;
   generating, by a decoder of the seq-to-seq model, a predicted transcription sequence from the first batch of embeddings;
   determining cross-entropy (CE) loss based on the predicted transcription sequence and the ground-truth transcription sequence;
   determining, at a discriminator, discriminator loss based on the first batch of embeddings and the second batch of embeddings; and
   training the seq-to-seq model end-to-end using both the CE loss and the discriminator loss to update seq-to-seq model weights and discriminator weights for enhanced robustness of the seq-to-seq model in automatic speech recognition.

2. The computer-implemented method of claim 1 wherein the labeled audio data is a clean audio data, the unlabeled audio data is augmented from the labeled audio data or from a different distribution.

3. The computer-implemented method of claim 2 wherein the unlabeled audio data incorporates a random Gaussian noise.

4. The computer-implemented method of claim 1 wherein the GAN is a Wasserstein GAN, the discriminator is a critic, the discriminator loss is a Earth-Mover (EM) distance between first batch of embeddings and the second batch of embeddings.

5. The computer-implemented method of claim 4 wherein updating seq-to-seq model weights and discriminator weights comprises steps of:
   determining a gradient of average CE loss with respect to the seq-to-seq model weights;
   updating the seq-to-seq model weights using the determined gradient of average CE loss;
   determining a gradient of average EM distance with respect to critic weights;
   updating critic weights using the determined gradient of average EM distance;
   clipping the updated critic weights to a range defined by a predetermined clipping parameter;
   repeating the above steps for a predetermined number of iterations to set the critic weights;
   determining a gradient with respect to the seq-to-seq model weights of a combination of average CE loss and average EM distance generated from a second batch of labeled audio data and a second batch of unlabeled audio data using the set clipped critic weight; and
   updating the seq-to-seq model weights using the determined gradient of the combination of average CE loss and average of EM distance with respect to the seq-to-seq model weights.

6. The computer-implemented method of claim 5 wherein the combination of the CE loss and the discriminator loss is a weighted combination with weight of the EM distance determined by a weight parameter.

7. The computer-implemented method of claim 1 wherein the seq-to-seq model is an attention-based model.

8. A system to enhance robust speech recognition using a generative adversarial network (GAN), the system comprising:
   a sequence-to-sequence (seq-to-seq) model comprising an encoder and a decoder for speech recognition, the encoder is treated as a generator of the GAN;
   a discriminator coupled to the encoder to form the GAN;
   one or more processors configured to train the seq-to-seq model and discriminator in a training process, the training process comprising:
      receiving, at the encoder, a batch of labeled audio data, the labeled audio data associated with corresponding ground-truth transcription sequence;
      receiving, at the encoder, a batch of unlabeled audio data;

generating, by the encoder, a first batch of embeddings and a second batch of embeddings corresponding respectively to the labeled audio data and the unlabeled audio data;

generating, by the decoder, a predicted transcription sequence from the first batch of embeddings;

determining cross-entropy (CE) loss based on the predicted transcription sequence and the ground-truth transcription sequence;

determining, at the discriminator, discriminator loss based on the first batch of embeddings and the second batch of embeddings; and training the seq-to-seq model end-to-end using both the CE loss and the discriminator loss to update seq-to-seq model weights and discriminator weights for enhanced robustness of the seq-to-seq model in speech recognition.

9. The system of claim 8 wherein the labeled audio data is a clean audio data, the unlabeled audio data is augmented from the labeled audio data or from a different distribution.

10. The system of claim 9 wherein the unlabeled audio data incorporates a random Gaussian noise.

11. The system of claim 8 wherein the GAN is a Wasserstein GAN, the discriminator is a critic, the discriminator loss is an Earth-Mover (EM) distance between first batch of embeddings and the second batch of embeddings.

12. The system of claim 11 wherein updating seq-to-seq model weights and discriminator weights comprises steps of:

determining a gradient of average CE loss with respect to the seq-to-seq model weights;

updating the seq-to-seq model weights using the determined gradient of average CE loss;

determining a gradient of average EM distance with respect to critic weights;

updating critic weights using the determined gradient of average EM distance;

clipping the updated critic weights to a range defined by a predetermined clipping parameter;

repeating the above steps for a predetermined number of iterations to set the critic weights;

determining a gradient with respect to the seq-to-seq model weights of a combination of average CE loss and average EM distance generated from a second batch of labeled audio data and a second batch of unlabeled audio data using the set clipped critic weight; and updating the seq-to-seq model weights using the determined gradient with respect to the seq-to-seq model weights of the combination of average CE loss and average of EM distance.

13. The system of claim 12 wherein the combination of the CE loss and the discriminator loss is a weighted combination with weight of the EM distance determined by a weight parameter.

14. The system of claim 12 wherein the seq-to-seq model is an attention-based model.

15. A non-transitory computer-readable medium or media comprising one or more sequences of instructions which, when executed by one or more microprocessors, causes steps to be performed, the steps comprising:

receiving, at an encoder of a sequence-to-sequence (seq-to-seq) model, a batch of labeled audio data, the labeled audio data associated with corresponding ground-truth transcription sequence;

receiving, at the encoder, a batch of unlabeled audio data;

generating, by the encoder, a first batch of embeddings corresponding to the labeled audio data;

generating, by using the encoder as a generator of a generative adversarial network (GAN), a second batch of embeddings corresponding to the unlabeled audio data;

generating, by a decoder of the seq-to-seq model, a predicted transcription sequence from the first batch of embeddings;

determining cross-entropy (CE) loss based on the predicted transcription sequence and the ground-truth transcription sequence;

determining, at a discriminator of the GAN, discriminator loss based on the first batch of embeddings and the second batch of embeddings; and training the seq-to-seq model end-to-end using both the CE loss and the discriminator loss to update seq-to-seq model weights and discriminator weights for enhanced robustness of the seq-to-seq model in speech recognition.

16. The non-transitory computer-readable medium or media of claim 15 wherein the unlabeled audio data incorporates a random Gaussian noise.

17. The non-transitory computer-readable medium or media of claim 15 wherein the GAN is a Wasserstein GAN, the discriminator is a critic, the discriminator loss is an Earth-Mover (EM) distance between first batch of embeddings and the second batch of embeddings.

18. The non-transitory computer-readable medium or media of claim 17 wherein updating seq-to-seq model weights and discriminator weights comprises steps of:

determining a gradient of average CE loss with respect to the seq-to-seq model weights;

updating the seq-to-seq model weights using the determined gradient of average CE loss;

determining a gradient of average EM distance with respect to critic weights;

updating critic weights using the determined gradient of average EM distance;

clipping the updated critic weights to a range defined by a predetermined clipping parameter;

repeating the above steps for a predetermined number of iterations to set the critic weights;

determining a gradient with respect to the seq-to-seq model weights of a combination of average CE loss and average EM distance generated from a second batch of labeled audio data and a second batch of unlabeled audio data using the set clipped critic weight; and updating the seq-to-seq model weights using the determined gradient with respect to the seq-to-seq model weights of the combination of average CE loss and average of EM distance.

19. The non-transitory computer-readable medium or media of claim 18 wherein the combination of the CE loss and the discriminator loss is a weighted combination with weight of the EM distance determined by a weight parameter.

20. The non-transitory computer-readable medium or media of claim 15 wherein the seq-to-seq model is an attention-based model.

* * * * *